United States Patent
Schindele (10) Patent No.: US 9,339,892 B2
(45) Date of Patent: May 17, 2016

(54) METHOD FOR JOINING WORKPIECES BY USING A JOINING ELEMENT AND HEATING THE JOINING ELEMENT AND THE WORKPIECES

(75) Inventor: Paul Schindele, Kempten (DE)

(73) Assignee: Hochschule fuer angewandte Wissenschaften—Fachhochschule Kempten, Kempten (DE)

( * ) Notice: Subject to any disclaimer, the term of this patent is extended or adjusted under 35 U.S.C. 154(b) by 421 days.

(21) Appl. No.: 13/990,288

(22) PCT Filed: Dec. 9, 2011

(86) PCT No.: PCT/EP2011/006226
§ 371 (c)(1),
(2), (4) Date: Jul. 31, 2013

(87) PCT Pub. No.: WO2012/084140
PCT Pub. Date: Jun. 28, 2012

(65) Prior Publication Data
US 2014/0061185 A1  Mar. 6, 2014

(30) Foreign Application Priority Data
Dec. 14, 2010 (DE) .......................... 10 2010 054 453

(51) Int. Cl.
*B23K 31/02* (2006.01)
*B23K 20/12* (2006.01)
(Continued)

(52) U.S. Cl.
CPC . *B23K 31/02* (2013.01); *B23K 5/00* (2013.01); *B23K 9/00* (2013.01); *B23K 11/00* (2013.01);
(Continued)

(58) Field of Classification Search
CPC .............. B23K 20/128; B23K 20/124; B23K 20/1255; B23K 5/00; B23K 15/0046; B23K 20/12; B23K 20/10; B23K 31/02; B23K 13/01; B23K 11/00; B23K 9/00; B23K 26/20; B23K 2203/10; B23K 2203/18

USPC ........ 219/617, 117.1, 121.14, 121.64, 137 R, 219/51, 55; 228/101, 110.1, 112.1, 51, 55; 156/73.5, 580
See application file for complete search history.

(56) References Cited

U.S. PATENT DOCUMENTS 5,718,366 A * 2/1998 Colligan .............. B23K 20/125
156/580
5,813,592 A * 9/1998 Midling ............... B23K 20/122
156/580

(Continued)

FOREIGN PATENT DOCUMENTS

CN 1503711 6/2004
CN 1814389 8/2006
(Continued)

OTHER PUBLICATIONS

W. Thomas et al. "Friction Processes Benefit from a Gas Shield" Welding and Metal Fabrication, IPC Ltd. Haywards Heath, GB, vol. 666, No. 4, May 1, 1998.

(Continued)

*Primary Examiner* — Quang Van
(74) *Attorney, Agent, or Firm* — Michael Best & Friedrich LLP (57) ABSTRACT

The present invention refers to a method for joining at least two workpieces, the method comprising the following method steps: providing and positioning the workpieces to be joined; providing at least one joining element; heating the joining element to a temperature substantially equal to its plasticizing temperature with at least one heat source; heating the workpieces at least in the region of a joint to a predetermined reaction temperature; and applying material of the joining element to the region of the joint with a relative movement taking place between the joining element and the region of the joint.

14 Claims, 12 Drawing Sheets

(51) Int. Cl.

| | | |
|---|---|---|
| *B23K 26/20* | (2014.01) | |
| *B23K 5/00* | (2006.01) | |
| *B23K 9/00* | (2006.01) | |
| *B23K 11/00* | (2006.01) | |
| *B23K 13/01* | (2006.01) | |
| *B23K 15/00* | (2006.01) | |
| *B23K 20/10* | (2006.01) | |

(52) U.S. Cl.
CPC ............ *B23K 13/01* (2013.01); *B23K 15/0046* (2013.01); *B23K 20/10* (2013.01); *B23K 20/12* (2013.01); *B23K 20/124* (2013.01); *B23K 20/128* (2013.01); *B23K 20/1255* (2013.01); *B23K 26/20* (2013.01); *B23K 2203/10* (2013.01); *B23K 2203/18* (2013.01)

(56) References Cited

U.S. PATENT DOCUMENTS

| | | |
|---|---|---|
| 2003/0042292 A1 | 3/2003 | Hatten et al. |
| 2004/0134971 A1 | 7/2004 | Narita et al. |
| 2006/0169748 A1 | 8/2006 | Ezumi et al. |
| 2006/0278325 A1 | 12/2006 | Kumagai |

FOREIGN PATENT DOCUMENTS

| | | |
|---|---|---|
| DE | 3802300 | 8/1989 |
| DE | 3781145 T2 | 1/1993 |
| DE | 69205991 | 4/1996 |
| DE | 10238550 | 3/2004 |
| DE | 10 2006 055994 A1 | 5/2008 |
| DE | 10 2008 044763 A1 | 3/2010 |
| EP | 1236533 | 9/2002 |
| EP | 1 354 660 A1 | 10/2003 |
| GB | 572789 A | 10/1945 |
| JP | 2000158154 | 6/2000 |
| JP | 2000317652 | 11/2000 |
| JP | 2004174575 | 6/2004 |
| JP | 2007319877 | 12/2007 |
| WO | 87/04957 A | 8/1987 |
| WO | 99/39861 A1 | 8/1999 |

OTHER PUBLICATIONS

International Search Report and Written Opinion of the International Searching Authority, PCT/EP2011/006226, dated Mar. 28, 2012. (English translation).

International Search Report received in International Patent Application No. PCT/EP2012/004669 dated Feb. 6, 2013.

International Search Report received in International Patent Application No. PCT/EP2012/004670 dated Feb. 6, 2013.

\* cited by examiner

METHOD FOR JOINING WORKPIECES BY USING A JOINING ELEMENT AND HEATING THE JOINING ELEMENT AND THE WORKPIECES

FIELD OF THE INVENTION

The present invention refers to a method for joining at least two workpieces, in the case of which material of a joining element is applied/introduced onto the region and/or into the region of a joint.

SUMMARY

The prior art shows very different procedures for joining workpieces. For instance, joint welding methods are known, in which a fusion welding process or a pressure welding process is carried out.

In the fusion welding process a shared fusion bath is normally produced between the workpieces to be joined and, optionally, a supplied weld filler material. The welded joint is formed upon solidification of the fusion bath.

In the fusion welding methods, a fusion solidification structure with material properties mostly differing from those of the base material is created in the weld seam. Furthermore, fusion welding turns out to be negative in the case of forced layers because there is the risk that the welding material will flow away due to gravity. The filler materials must often be produced in complicated processes as electrodes.

Pressure welding methods normally require the heating of the two workpieces to be joined to a softening temperature and the application of a pressing force which presses the plastic regions of the workpieces to be joined into one another.

In pressure welding methods, there is mostly a limitation to specific workpiece and seam geometries, such as overlaps in the case of spot or roll-seam welding or a rotation symmetry in the case of rotational friction welding. It turns out to be a drawback that mostly complicated compression devices have to be used for the pressing operation. This will most of the time create a compression bead on the workpieces. In the case of friction stir welding there is also a limitation to specific softer materials and maximum seam thicknesses.

It is the object of the present invention to provide a method for joining at least two workpieces which wile being of a simple design and feasible in an easy way at low costs avoids the drawbacks of the prior art and ensures a good joining connection.

According to the invention this object is achieved by the feature combination of claim 1; the sub-claims show further advantageous embodiments of the invention.

According to the invention it is thus intended that the workpieces to be joined are first provided and positioned. Furthermore, at least one joining element is provided. The joining element is subsequently heated to a temperature that is substantially equal to its plasticizing temperature. Heating is carried out by means of at least one heat source.

According to the invention it is possible to use very different heat sources, the number and use of which depends on the respective material of the joining element and on the ambient temperatures. For instance, it is possible to heat the joining element by way of external rotating or oscillating friction elements or friction jaws (friction heat). It is possible to carry out heating by way of induction heating, by a heating flame, by an electric arc, by resistance heating, by laser beams, electron beams or hot gases. Ultrasonic heating or scorching contacts, as are known from flash butt welding, can also be used.

Furthermore, according to the invention it is intended that the workpieces are preheated at least in the region of the joints to a predetermined reaction temperature. As for the heating of the workpieces, heat sources as have been listed above may be used.

Subsequently, material of the joining element is applied/introduced according to the invention onto and/or into the region of the joint; this is done by way of a relative movement between the joining element and the region of the joint. Owing to the relative movement a weld seam or weld bead is produced; at least one layer of the material of the joining element is applied/introduced onto the region and/or into the region of the joint. Hence, the material of the joining element is squeezed or pressed on according to the invention. It may be particularly advantageous when an additional pressure welding force is applied or when the joining element is pressed or squeezed at a predetermined pressure onto the region of the joint.

Especially in the case of metallic materials the structural regions are joined, in a way similar to a pressure welding process, especially by diffusion processes or by crystal growth. Adhesion processes and mechanical clamping may also be conducive to the connection.

For the generation of a joining connection according to the invention, particularly a welded joint, the workpieces to be joined are preferably provided in the region of the joint with bevels or shoulders; thus a seam preparation, similar to fusion welding, is carried out. In the case of rather thin materials of the workpieces the method may also be carried out according to the invention with a butt joint connection without any beveling of the workpieces in that an application bead consisting of the material of the joining element bridges the joint at one side or both sides.

In the case of rather thick workpieces, an I-, U-, V- or double-V-shaped joint or a T-joint is preferably produced by beveling. The workpieces are then fixed relative to one another by clamping elements, by form closure or by tack welding. According to the invention the interstice is subsequently filled by squeezing or pressing in the material of the joining element, or a fillet is formed.

According to the invention the material of the joining element may be similar or dissimilar to the material of the workpieces. It is also possible to join workpieces of different materials by means of the joining method according to the invention.

The relative movement of the joining element relative to the workpieces can be realized according to the invention in that the joining element is configured as a rotating rod or rotating disc. It is also possible to hold the joining element in a fixed manner and to move the workpieces, for instance when these are given the shape of a tube or a rod. At any rate an adequate amount of material of the joining element has to be constantly supplied to ensure an adequate application of material of the joining element.

According to the invention the relative movement can also take place by way of a wave shape or orbital shape with a rotating joining element around a fixed workpiece. Likewise, an oscillating movement is possible according to the invention in the longitudinal direction of the region of the joint.

Hence, owing to the squeezing and pressing on of the plasticized preheated material of the joining element as intended according to the invention, a joining connection is formed similar to a pressure welding connection.

It is intended in a particularly advantageous development of the invention that the method according to the invention is repeated several times so as to apply/introduce a plurality of layers of the material of the joining element. To fill a broad weld groove, it may be advantageous to move the joining element by way of a pendulum movement in a direction transverse to the groove in addition to its advance movement.

In the joining method according to the invention attention has to be paid that the heat management of the workpieces and of the joining element before and during the joining operation is carried out in a proper way. The temperature of the joining element is here higher than the temperature of the region of the joint of the workpieces as the joining element is preheated by an external preheating operation to a joining temperature. To compensate for heat losses and to ensure an exact temperature control, it may be particularly advantageous to heat the workpieces particularly in the region of the joints as well as the joining element both before and during the joining operation. It is thereby ensured that the materials of the workpieces and of the joining element establish a mutual joining connection under the contact pressure, especially a pressure welding connection. The additional heating during the joining operation can be carried out by way of external additional heat sources; it is also possible to provide for the heat supply by way of a friction process, e.g. by way of friction jaws on the joining element and/or by way of reaming the workpieces by a reamer during the joining operation between the plasticized material of the joining element and the preheated region of the workpieces.

In the joining method according to the invention it turns out to be particularly advantageous that neither the material of the joining element nor the materials of the workpieces have to be heated to a melting temperature. This results in a lower heat load. Furthermore, the structure especially of the workpieces, which is normally a forming structure, is not impaired or only impaired to an insignificant degree. In addition, there is less deformation caused by the joining process, so that subsequent straightening or calibrating can be dispensed with.

It is possible with the joining method according to the invention to join materials that are not connectable with conventional welding methods.

A further advantage of the method according to the invention is that forced layers can be joined without any problems because the material supplied by the joining element cannot flow away or drip off.

The joining element to be used according to the invention, which may be rod-shaped, disc-shaped or configured in a similar way, can be produced at low costs. Additional fluxes or additional covering materials can be dispensed with in the method according to the invention. Hence, the problem which is created by the slag appearing in fusion welding, which slag has to be removed on the one hand and poses the risk of inclusions on the other hand, does normally also not arise. Likewise, the use of protective gases can often be omitted.

According to the invention materials of the joining element (filler materials with very different material properties) can also be joined or welded by way of the targeted heat control with external heat sources.

In comparison with a standard pressure welding method, complicated compression devices are not needed owing to the joining method according to the invention. Hence, no compression bead is formed that would have to be treated later. A ridge can be applied by way of the material application by the joining element in the desired way.

It is possible with the method according to the invention to implement joining connections (weld connections) of any desired thickness by way of the multilayered application of the material of the joining element.

According to the invention it is also possible to provide, instead of one joining element, a plurality of such joining elements so as to apply e.g. thicker material layers. Said plurality of joining elements may here consist of the same material or of different materials.

BRIEF DESCRIPTION OF THE DRAWINGS

The present invention will now be described with reference to embodiments in combination with the drawing, in which.

Like parts will be provided with like reference numerals in the following embodiments.

DETAILED DESCRIPTION

Figure 1:
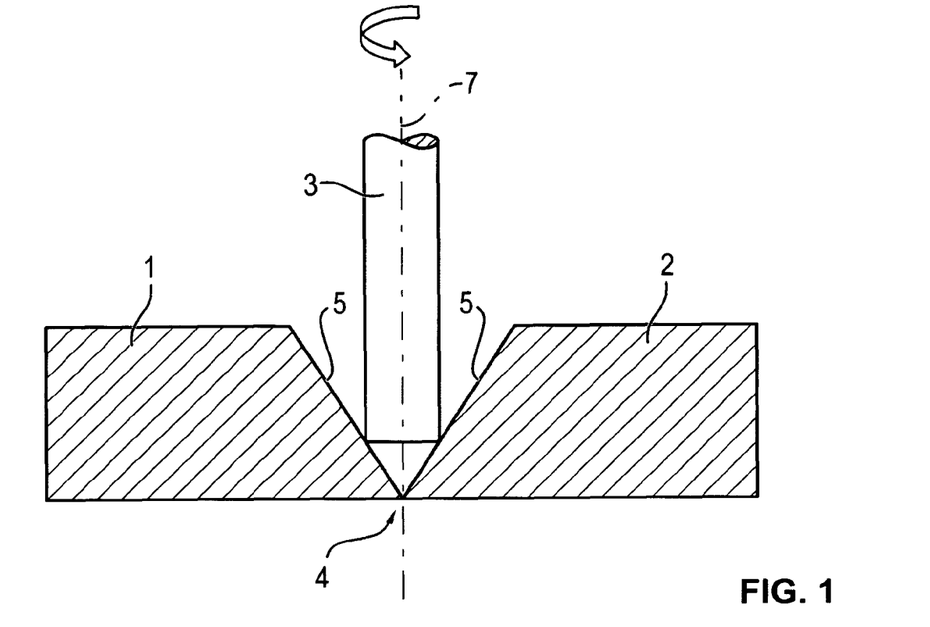
FIG. 1 is a schematic illustration of an arrangement of two workpieces and of a joining element in an initial position.

FIG. 1 shows workpieces 1 and 2 that are arranged side by side to form a joint. The edges of the workpieces are each provided with a bevel 5.

Figure 2:
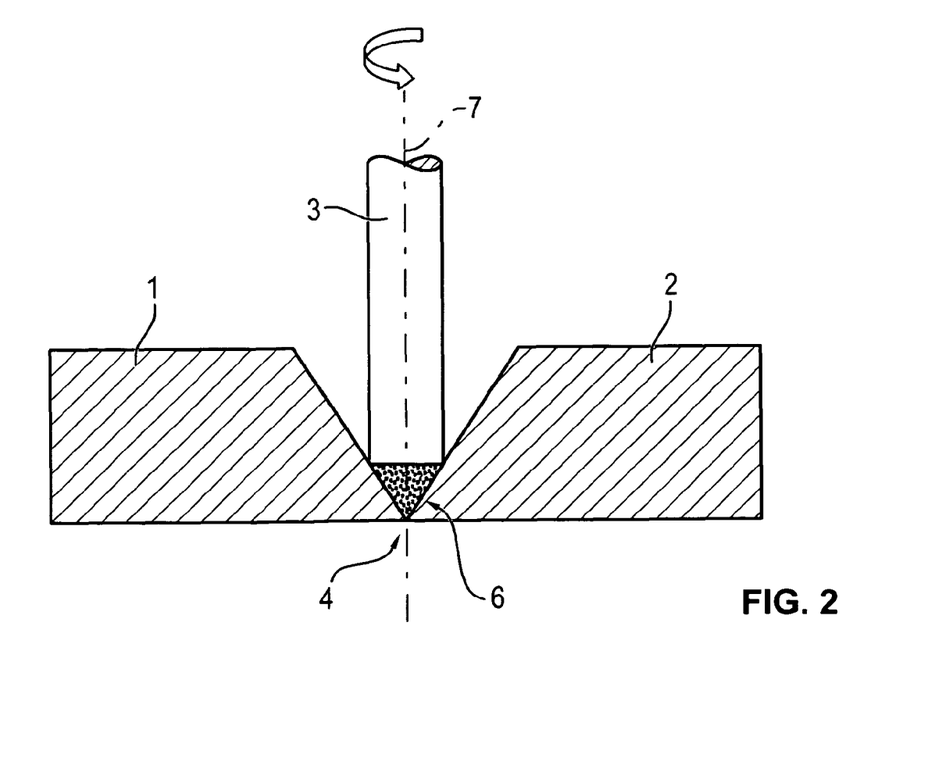
FIG. 2 shows the arrangement of FIG. 1 with a first applied layer of joining material.

In the embodiment shown in FIG. 1, a joining element 3 is configured in the form of a rod. A relative movement of the joining element 3 is illustrated by the arrow in FIG. 1. In FIG. 2, the joining element 3 is pressed or squeezed into the joint 4 for applying a first layer 6 consisting of material of the joining element. The contact pressing force needed therefore is especially applied in the direction of a longitudinal axis 7 of the joining element 3. The material of the joining element 3 which is preheated to a plasticizing temperature is pressed or squeezed into the joint 4.

Figure 3:
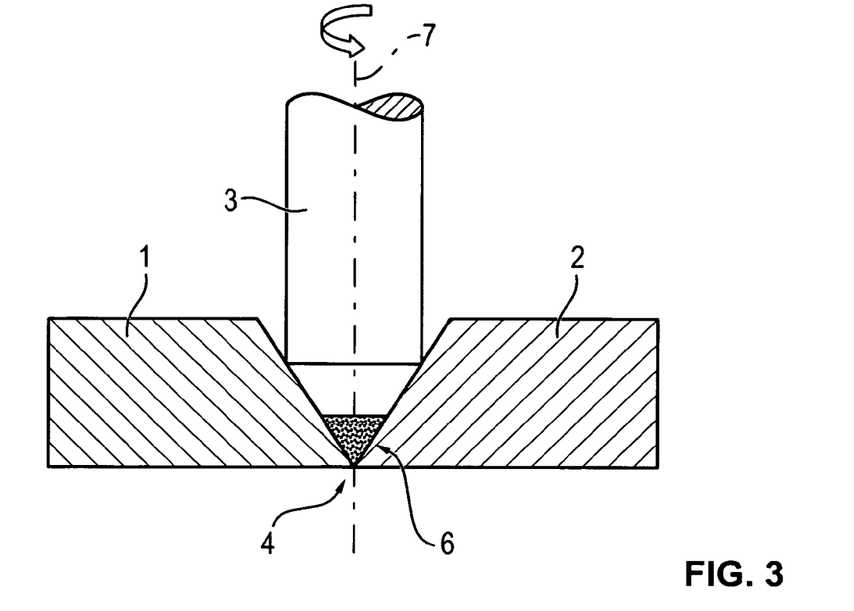
FIG. 3 shows the arrangement of FIG. 2 applying a second layer of joining material.
Figure 4:
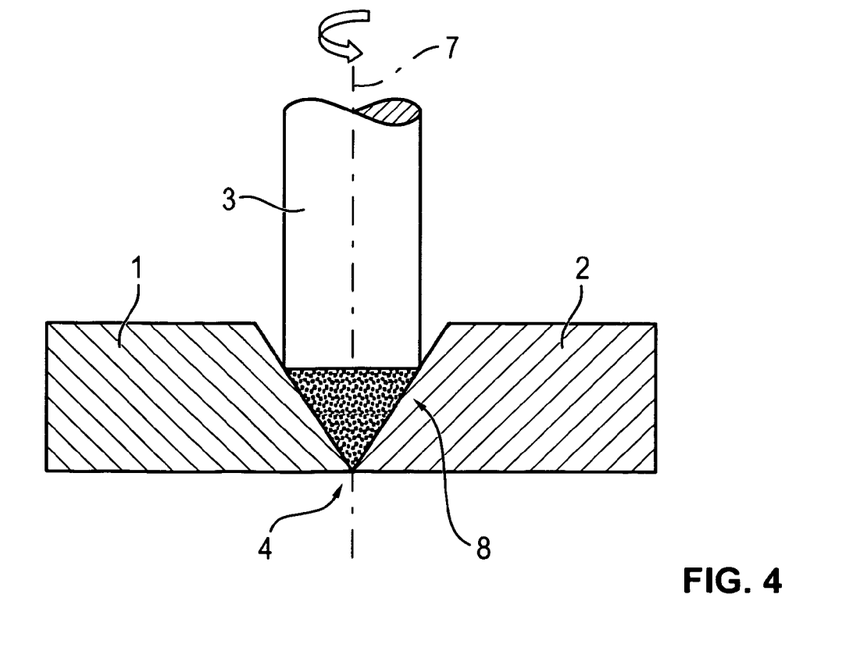
FIG. 4 shows the arrangement of FIG. 3 with a second applied layer of joining material.

For the application of a second layer 8, a joining element is used, as shown in FIGS. 3 and 4, which has a diameter larger than the joining element for applying the first layer 6 (FIGS. 1 and 2). By analogy, the preheated, plasticized material of the joining element 3 is squeezed or pressed onto the joint 4 during a relative movement of the joining element 3, so that the second layer 8 is formed (see FIG. 4). The joint 4 is completely closed by repeating the method of the invention once again with joining elements 3 having a larger diameter.

Figure 5:
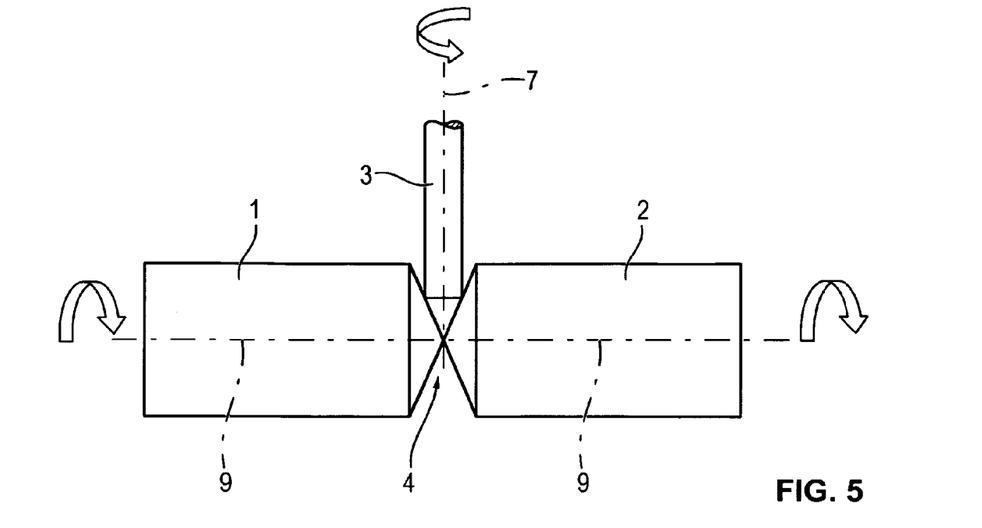
FIG. 5 is an illustration of another embodiment of the arrangement with relative movement of the workpieces.
Figure 6:
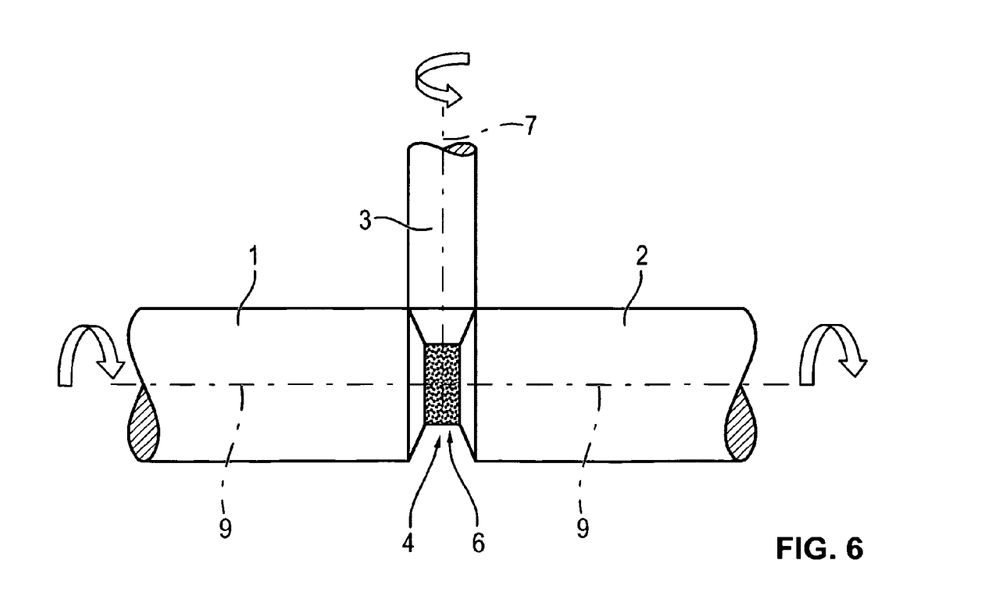
FIG. 6 shows the arrangement of FIG. 5 with application of a first layer of joining material.

FIG. 5 shows an embodiment in which the workpieces 1, 2 are rotated about their longitudinal axis 9. This rotation is carried out in addition to a rotation of the joining element 3 about its longitudinal axis 7. Hence, in the case of rod-shaped workpieces 1, 2 the application of a first layer 6 of material of the joining element 3 is carried out (FIG. 6). The joint 4 is completely closed in a further repetitive step of the method according to the invention (see FIG. 7).

Figure 7:
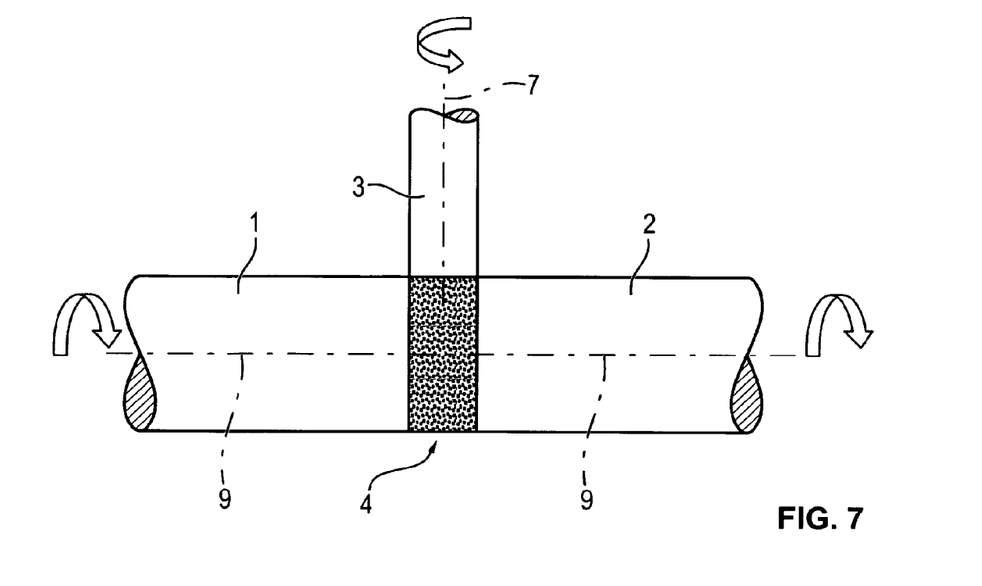
FIG. 7 shows the arrangement of FIG. 6 with application of a further layer of joining material.
Figure 8:
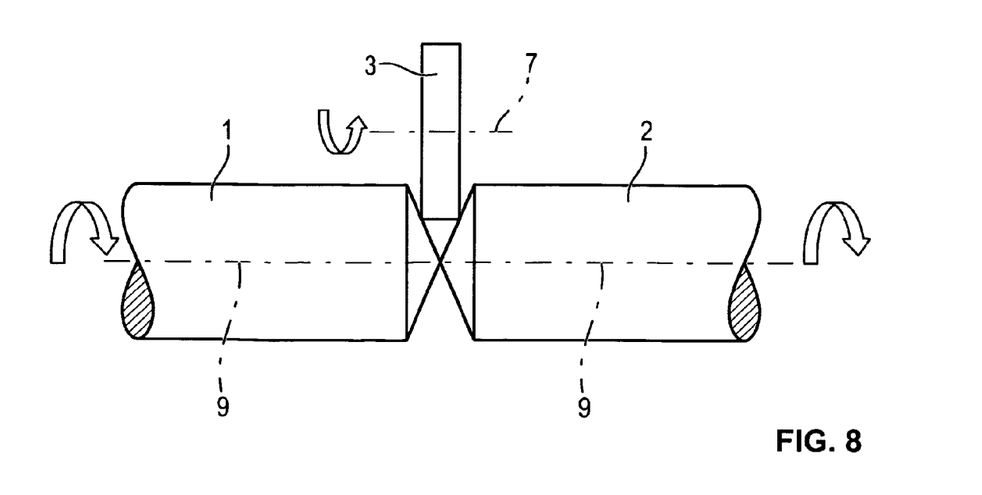
FIG. 8 shows the arrangement of FIG. 5 with a disc-shaped joining element.

The embodiment shown in FIG. 8 shows a disc-shaped joining element 3 which is rotating about its central axis 7 such that a joining connection is established by analogy with the embodiment shown in FIGS. 5 to 7.

Figure 9:
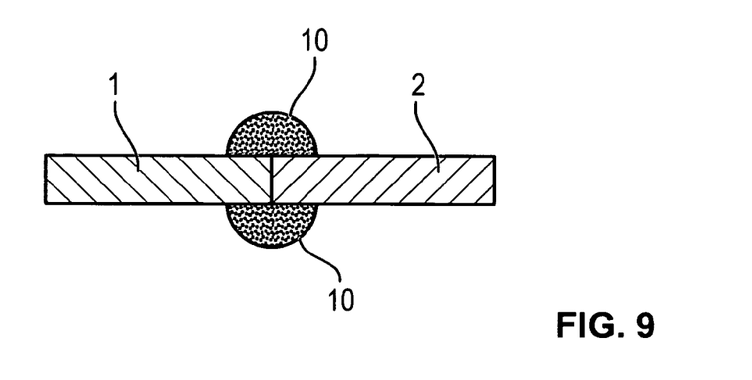
FIG. 9 shows another embodiment of the arrangement with a butt joint with overlapping layer of joining material.

The embodiment shown in FIG. 9 shows a butt joint with overlapping bead 10 consisting of material of the joining element (not shown). By analogy with the illustration in FIG. 9, in which flat workpieces 1, 2 are joined, it is also possible to join tubular workpieces 1, 2.

Figure 10:
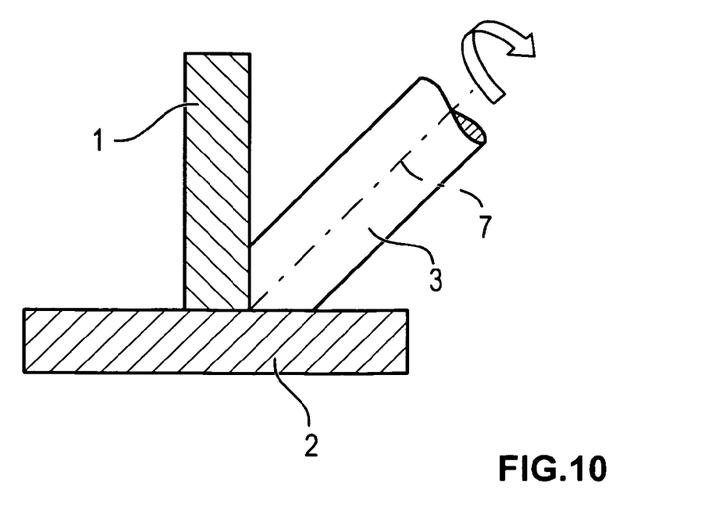
FIG. 10 shows another embodiment of the arrangement with a T-joint with rotating or oscillating joining element.

FIG. 10 shows a T-joint. In this embodiment, the joining element 3, which is rotating about its longitudinal axis 7, is arranged at an angle relative to the workpieces 1, 2 forming the T-joint so as to form a single-layered or multi-layered fillet.

Figure 11:
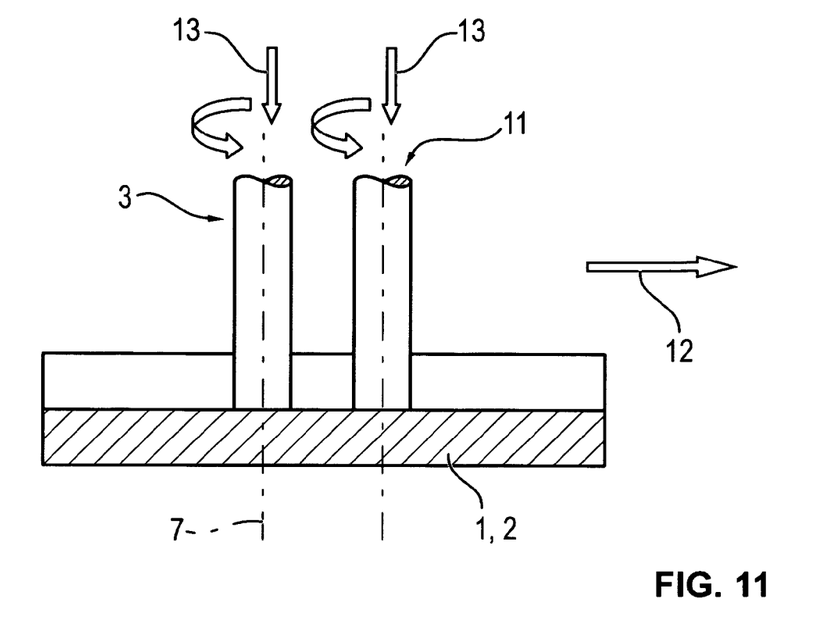
FIG. 11 is a schematic illustration of another embodiment with an additional friction element.
Figure 12:
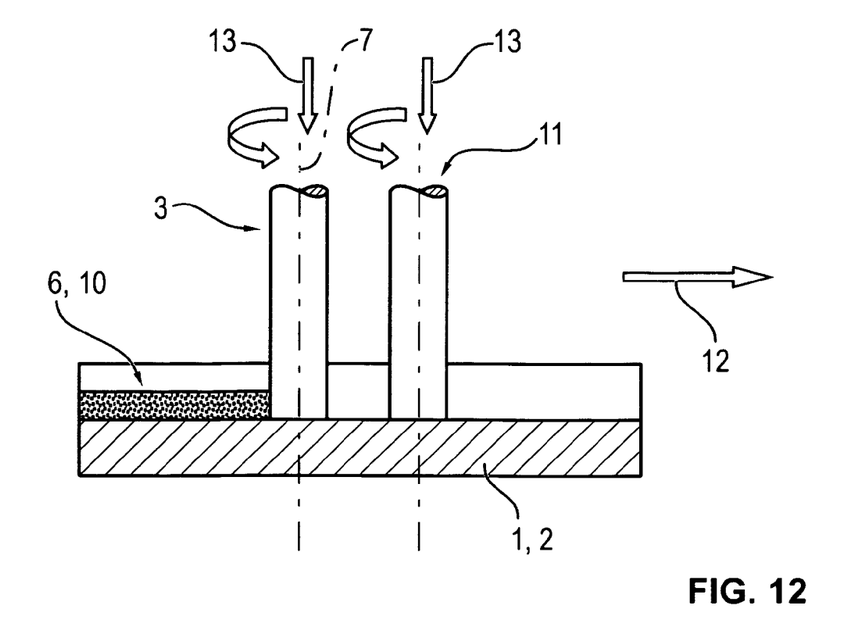
FIG. 12 shows the arrangement of FIG. 11 with applied weld bead.
Figure 13:
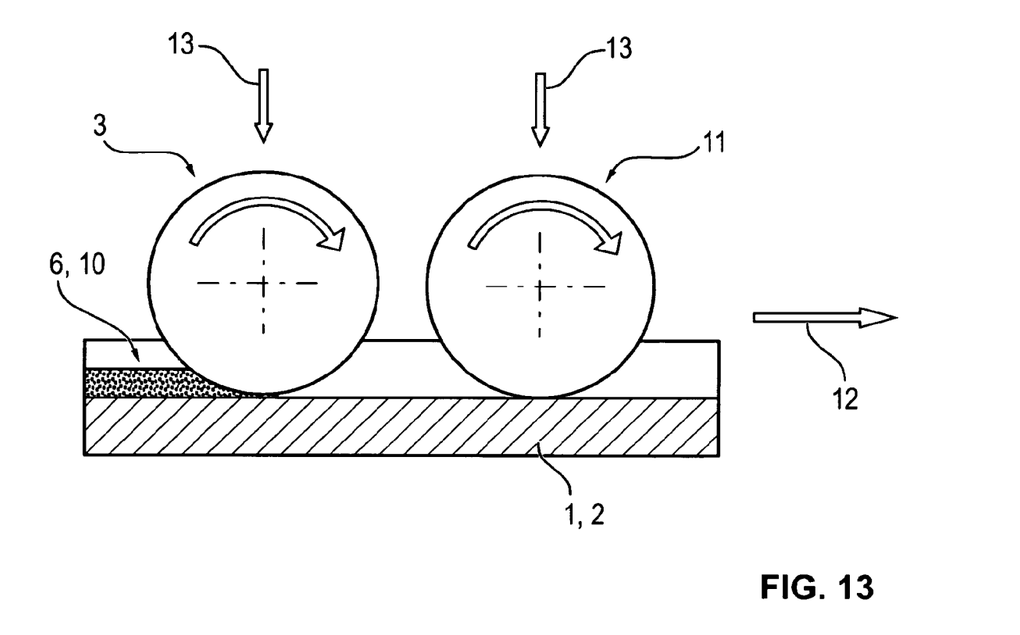
FIG. 13 is a schematic illustration of another embodiment with an advancing friction element.

FIGS. 11 to 13 show embodiments in which an additional friction element 11 is running ahead of the joining element 3. In the embodiment of FIGS. 11 and 12, the friction element 11, just like the joining element 3, is rod-shaped and is rotating about its longitudinal axis, as illustrated by the arrows. Hence, ahead of the joining element 3, the rod-shaped friction element 11 is provided, which generates friction heat by rotating about its longitudinal axis. Said heat serves to preheat workpieces 1 and 2, respectively. Hence, an external preheating of the workpieces 1, 2 can be omitted and the additional friction element 11 can thus introduce additional thermal energy. In FIGS. 11 to 13, the arrow 12 shows the advance direction.

In the embodiment shown in FIG. 13, the joining element 3 is configured as a disc or roller (e.g. by analogy with the embodiment shown in FIG. 8). Likewise, FIG. 13 shows that a disc-shaped or roller-shaped friction element 11 is provided ahead of the joining element 3 in advance direction 12, said friction element 11 being in frictional contact with workpiece 1 and 2, respectively, and heating the surface thereof.

FIGS. 11 to 13 additionally show by way of arrows 13 the exertion of a contact pressing force on both the joining element 3 and the additional friction element 11. The plasticized material of the joining element 3 is squeezed or pressed on by the contact pressing force 13 exerted on the joining element 3.

Individual examples shall now be described with reference to FIGS. 14 to 18.

Temperatures for Welding Aluminum Materials:

The temperature window for aluminum materials lies between 220° C. and 360° C. and depends on the component volume of the substrates. During welding of thin sheets of AlMgSi0.5 with a filler material of AlMgSi0.5 the substrate is inductively heated to temperatures of about 220° C. The filler material is not preheated for the reason that the heat from the friction process and the hot base material is adequate for the joining process.

Figure 14:
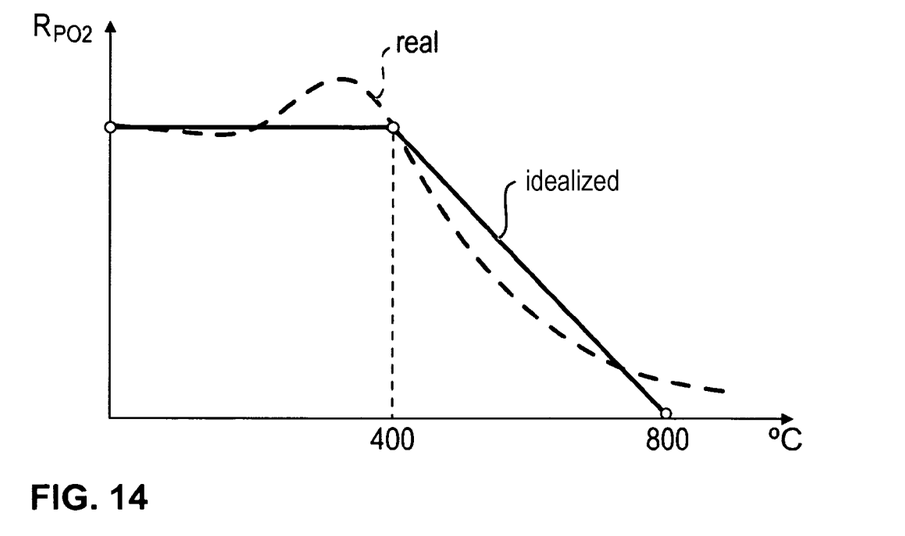
FIG. 14 is a diagram on the temperature dependence of the yield strength of a joining material.

Temperatures for Welding Steel Materials:

The temperature window for steel materials is about 800° C. During the welding of thin sheets of St1203 with a filler material of S235JR, good results were achieved at a bolt temperature of about 800° C. and without any heating of the substrate. FIG. 14 shows the decrease in the yield strength of steel with an increasing temperature up to plasticization at about 800° C.

The following tables indicate the parameters of joining examples that have yielded good results:

Friction Seam Welding of Thin Sheets by Means of an I-Seam:

Joining of Sheets of AlMgSi0.5 with a Filler Material of AlMgSi0.5

| t(S) mm | Ø(B) mm | n 1/min | p bar | F N | v mm/min | T(S) ° C. | T(B) ° C. |
|---|---|---|---|---|---|---|---|
| 2 | 12 | 12000 | 2 | 695 | 500 | 220 | 20 |

Joining of Sheets of St1203 with a Filler Material of S235JR

| t(S) mm | Ø(B) mm | n 1/min | p bar | F N | v mm/min | T(S) ° C. | T(B) ° C. |
|---|---|---|---|---|---|---|---|
| 1 | 10 | 12000 | 5 | 1611 | 300 | 20 | 800 |

F force in N
n speed in 1/min
Ø(B) diameter of the bolt in mm
p pressure in bar
T(B) temperature of the welding filler bolt in ° C.
T(S) temperature of the substrate material in ° C.
t(S) sheet thickness of the substrate in mm
v advance speed in mm/min Welding Results During the Weld Joining of Aluminum Sheets:

Sheets of AlMgSi0.5 with a sheet thickness of 2 mm were welded by means of a bolt-like joining element of AlMgSi0.5 with a bolt diameter of 12 mm.

Welding Results During the Weld Joining of Steel Sheets:

Sheets of St1203 with a sheet thickness of 1 mm were welded by means of a bolt-like joining element of S235JR with a bolt diameter of 10 mm.

Comparison with Existing Methods:

Comparable methods are friction stir welding and the method described in EP 1 354 660 A1, with which sheets are welded by means of a V-seam.

Drawbacks of the known friction stir welding over the friction seam welding according to the invention:
  Only extrudable materials, such as aluminum, copper, zinc, silver and the alloys of said materials, can be welded. The use in steel materials is not possible.
  Bonding defects due to oxide inclusions are possible.
  Great joining forces and expensive clamping devices are required.
  Both sides of the sheets must be accessible.
  Almost no gap bridging capability for lack of welding filler.
  Makes only sense in the case of large quantities and special uses.

Drawbacks of the method described in EP 1 354 660 A1 over the friction seam welding with external additional heating according to the invention:
  Only very small beads are applied since the whole welding heat has to be generated from the friction process. If the substrate material is rather thick and discharges a lot of heat, only very thin weld beads can be applied. With the external additional heating according to the invention it is possible to bring thicker layers of both the base material and the application material to the necessary plasticizing temperature. Thicker weld beads are thereby created if necessary.

The necessary temperatures are generated solely via a friction process that is difficult to control and the major control parameters thereof are speed and contact pressing force as well as advance speed.

Greater technological efforts for the temperature control.

Improvements offered by the friction seam welding according to the invention with external additional heating over the known friction stir welding:

Sheets of steel also of increased hardness can be welded to one another because they can be adjustably plasticized by the additional heating.

Simple design of the clamping devices.

Very thin sheets (<1 mm) can be joined.

Sheets can be joined with a dissimilar filler material.

It is possible to produce overlap joints.

Gaps can also be bridged.

Advantages offered by the friction seam welding according to the invention with external additional heating:

It is possible to implement several types of seams.

The substrate and the filler material can be heated separately.

Simple control of the preheating temperature.

An important aspect of the invention is the separate additional heating of workpiece and application material with at least one additional heat source in addition to the mere heating by way of friction. It is here the aim to bring the two materials of base material and application material to a suitable temperature level and to keep the temperature level during the coating operation, at which level the two materials form a welded joint by application of pressure.

The targeted heating of the application material to the plasticizing temperature permits an application of the filler material according to the invention to the base material. In case of a flawed heat control it may happen that the base material is applied to the filler material, so that there will be no welded joint, but the application material will be coated with the base material. Due to the additional relative movement, which may take place in rotating or oscillating fashion or in a combination of rotation and oscillation, the welding material is applied to the parts to be joined. A good adhesion of the welding material to the surface of the parts to be joined is predominantly defined by way of a controlled and exact heat management before and during the process.

The energy needed for this heating of base material and application material derives in conventional friction welding solely from the friction process between workpiece and application material. This friction process is substantially defined by the speed or oscillation frequency, the contact pressing force and the friction values between base material and application material, such as friction coefficient and surface roughness.

Heat capacity, heat conductivity, thickness of the parts to be joined, advance speed, cooling of the application material and of the base material by draft at high speeds of the application material are responsible for the dissipation of the introduced heat.

If these values vary during the welding process, e.g. due to excessive plasticization of the base material, the resulting friction energy will be decreasing. This will then lead to a cooling of the application material below the necessary plasticizing temperature and thus to an interruption of the application process. As an example thereof, mention should be made of the application of weld beads consisting of different steels (S235, VA, 100Cr6) onto aluminum, as carried out according to the invention, which was not possible with the former methods and could be carried out with success with the additional heating according to the invention before and during the welding process.

Without the additional heating of the harder filler material in these examples, the steel material would pierce into the softer aluminum during the friction process, but would not generate an application bead.

Figure 15:
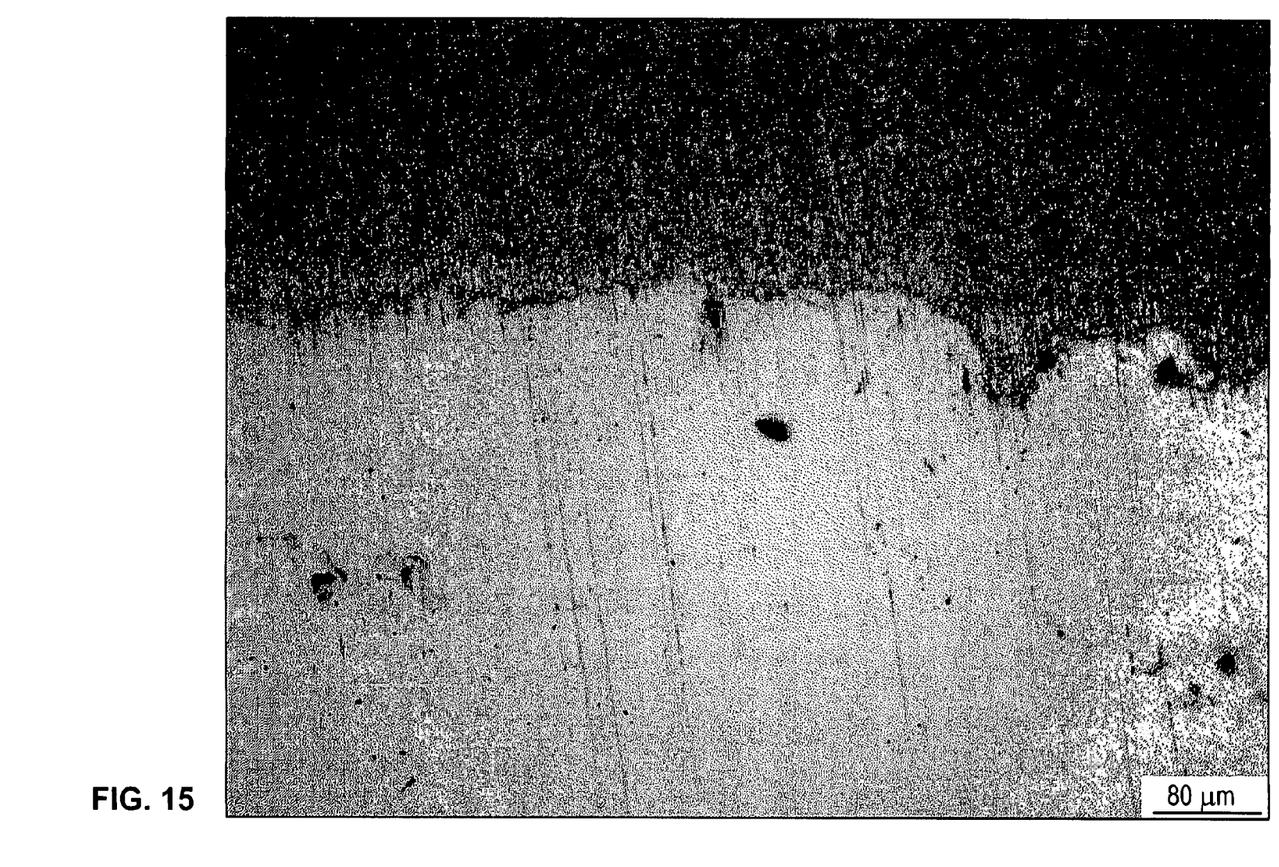
FIG. 15 is a micrograph of an embodiment of a welded joint of S235 on aluminum.
Figure 16:
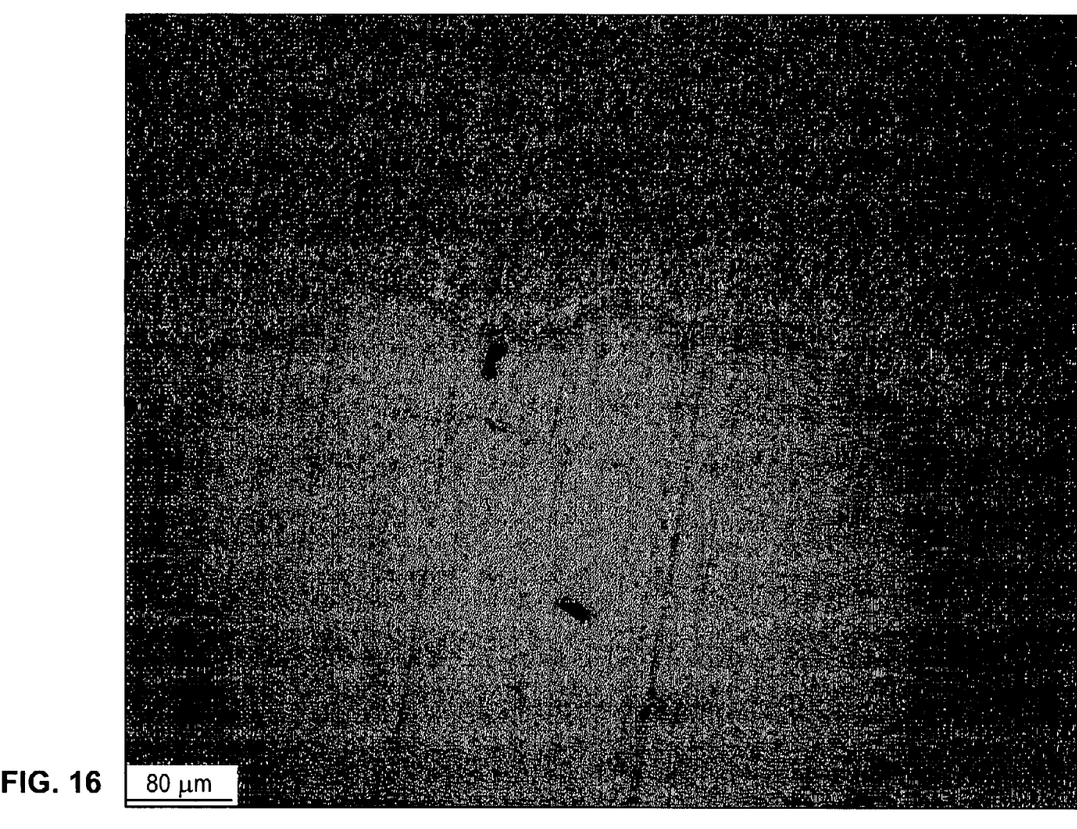
FIG. 16 is a micrograph of VA on aluminum.
Figure 17:
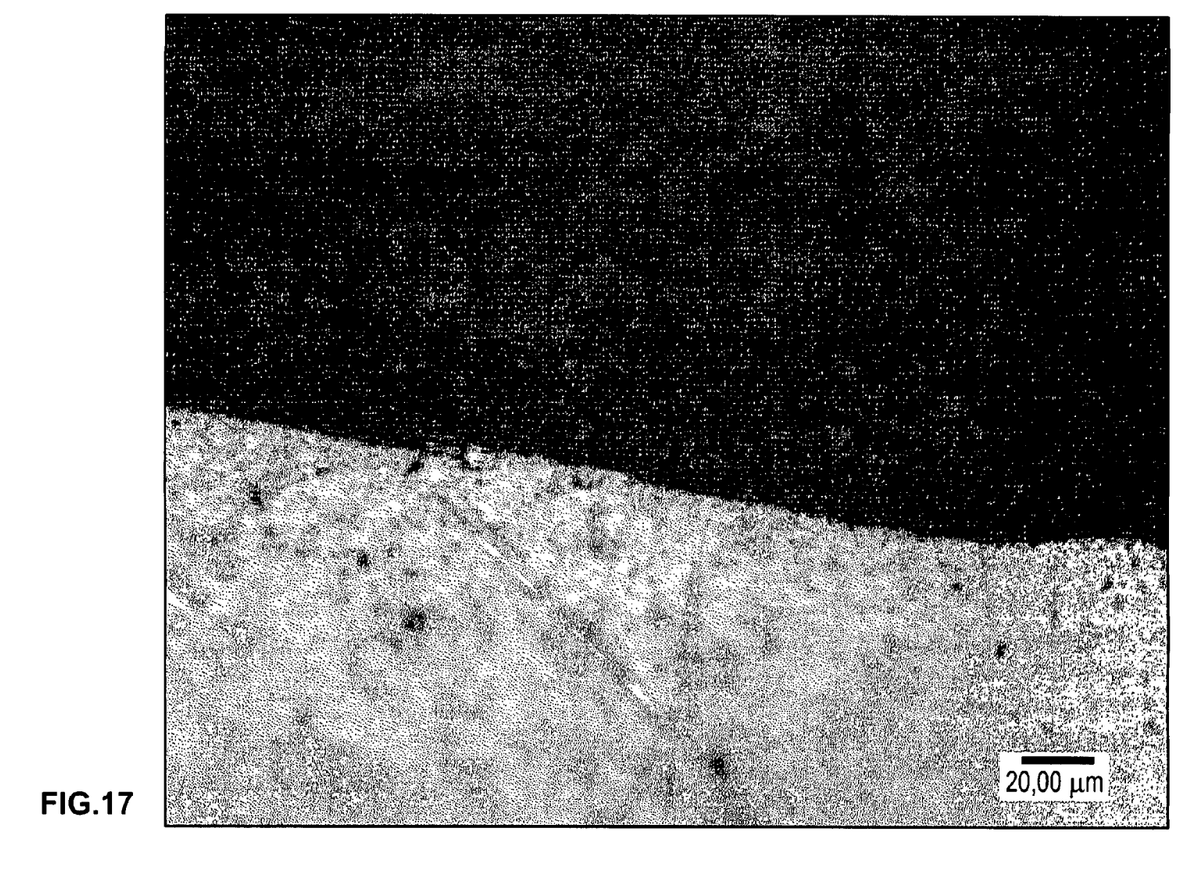
FIG. 17 is a micrograph of 100 Cr6 on aluminum (etched)

Each of FIGS. 15 to 17 shows a micrograph of the welded joints produced. FIG. 15 shows a welded joint of S235 on aluminum; FIG. 16 shows a welded joint of VA on aluminum; FIG. 17 shows a welded joint of 100 Cr6 on aluminum (etched).

Influence of the Friction Values of Base Material and Application Material on the Welding Process:

If the friction values are already low at the beginning of the application process, as is the case with materials of high flowability or good sliding properties (gray iron, bearing bronze, brass), there will be no friction application in the procedure known from the prior art as no adequate heat is generated from the friction process.

A mere preheating is e.g. only successful to some extent in these applications since especially in the case of rather thick joining parts so much heat will flow off that a welding process which might be promising at the beginning comes to a standstill after a short welding route. It is only a controlled, regulated additional heat supply to base material and filler material, as intended according to the invention, which will keep the welding process at the necessary process temperature.

Another advantage of the additional regulated heating of base material and filler material lies in the selective generation of thick or thin application beads. If the application material is plasticized by more heat to a greater extent and over a larger material thickness, it is possible to apply more material in one run. The thickness of the bead is then controllable via the advance speed and the supplied heat. For instance, much higher welding speeds or thicker seam layers can be achieved with the method according to the invention.

Figure 18:
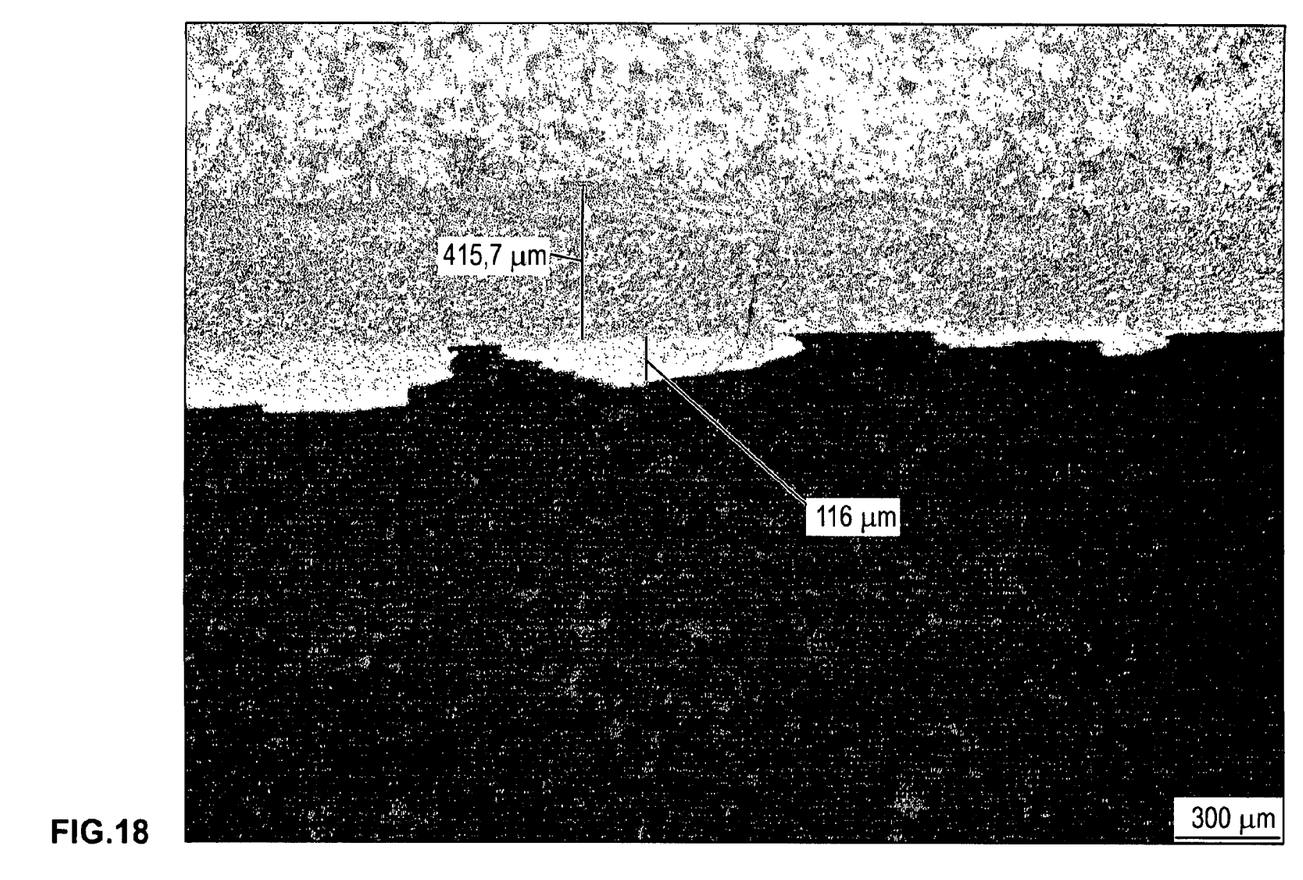
FIG. 18 is a micrograph of the structure of base material and applied weld bead.

Influencing the Microstructure:

The separate heat supply according to the invention has turned out to be advantageous for influencing the seam structure. For instance, a fine-grained seam structure can be produced via the targeted heat management, combined with the stirring process of the method according to the invention, or an undesired formation of martensite can be suppressed. This is illustrated by the seam structure of a seam of S235 on S235 sheet, in the case of which the seam structure is much finer than that of the base material, as is shown in FIG. 18. The upper portion of the micrograph shows the base material of the workpiece, namely, rolled sheet S235. Next to this, one can see a fine-grained structure of the weld seam of S235.

In the case of multilayer welding operations, bonding flaws may arise between the individual seam layers due to the inadequate heating of the neighboring weld beads by the mere friction process. According to the invention these flaws can be avoided by adequately heating the environment of the new weld bead formed because in this case the welding material is mixed in the plastic range in the edge portion between new and existing weld bead.

Controlled Heat Management in the Case of Thick Workpieces:

The controlled heat supply in addition to the friction process makes it possible according to the invention to perform local welding operations on thick workpieces, in the case of which too much heat is normally discharged so that a firm welded joint cannot be achieved. As an example of this, the filling of cavities on castings should be mentioned in that these are tapped and the bore is filled by friction spot welding with controlled heat management.

As shown by the description of the invention and especially the description of the comparative examples, the following aspects apply to the heat management of the invention:

Covering layers next to and above one another are feasible. Owing to the invention a co-heating of the neighboring beads and a blending are possible.

A uniform application with a better bonding of hard layers on aluminum is possible, wherein e.g. structural steel can be applied to aluminum. Owing to the invention uniform and bonding beads can be realized, even with 1.3505 (100Cr6).

Higher advance values along the substrate are possible. According to the invention the plasticity range is achieved and maintained at a much faster pace, whereby very high advance values are possible, e.g. twice the values of the prior art. These can still be realized at 150 mm/min at a layer thickness of 1 mm to 1.5 mm.

Material combinations are weldable in the case of which the friction coefficient is too low so that it is not possible to generate adequate friction heat for the plasticization of the application material. 100Cr6 on aluminum should here be mentioned as an example.

A selective structural adjustment of substrate and application material is carried out during and after the process. After the process excessively rapid cooling can be prevented. Hence, undesired structural changes (e.g. excessive hardening) of the substrate can be prevented. During and before the process it is possible to set structures that can be joined in an improved manner; e.g. an austenitizing temperature of both materials is aimed at.

According to the invention thick or thin weld beads can be produced by way of a suitable heat management.

Materials of high heat conductivity and high heat capacity are weldable according to the invention by permanent supply of heat.

During coating the material can be kept so soft that filler materials, such as hard materials, can be introduced into the seam.

LIST OF REFERENCE NUMERALS 1, 2 workpiece
3 joining element
4 joint
5 bevel
6 first layer
7 longitudinal axis/axis/central axis
8 second layer
9 longitudinal axis
10 bead
11 friction element
12 advance direction
13 contact pressing force

The invention claimed is:

1. A method for joining at least two workpieces, comprising the following method steps in the following order:
   providing and positioning the workpieces to be joined;
   providing at least one joining element;
   heating the joining element to a temperature substantially equal to its plasticizing temperature with at least one external heat source;
   heating the workpieces at least in the region of a joint to a predetermined reaction temperature; and
   applying the joining element to the region of the joint with a relative movement taking place between the joining element and the region of the joint.

2. The method according to claim 1, wherein the joining element is heated for plasticization to a higher temperature than the region of the joint.

3. The method according to claim 1, wherein the heating of the joining element or of the joint is carried out by at least one of friction heat and induction heat and heating-flame heat and electric-arc heat and resistance heat and laser beams and electron beams and ultrasonic heating and hot-gas heating and scorching contacts.

4. The method according to claim 1, wherein the joining element is applied or introduced onto or into the region of the joint by way of a friction process.

5. The method according to claim 4, wherein the process step of applying or introducing the joining element onto or into the region of the joint is repeated several times.

6. The method according to claim 1, wherein the joining element or at least the region of the joint is heated during the joining operation.

7. The method according to claim 1, wherein the joining element is applied to the region of the joint by applying a contact pressing force.

8. The method according to claim 1, wherein the at least one joining element includes a plurality of joining elements.

9. The method according to claim 1, wherein the region of the joint of at least one of the workpieces to be joined is preprocessed.

10. The method according to claim 1, wherein a pressure is applied between the joining element and the workpieces particularly in the region of the joint, that the joining element is urged with a pressure welding force against the workpieces and that the workpiece is heated by means of at least one advancing friction element.

11. The method according to claim 8, wherein at least one joining element of the plurality of joining elements is formed from a different material than the other joining elements.

12. The method according to claim 11, wherein each joining element of the plurality of joining elements is applied simultaneously onto or into the region of the joint.

13. The method according to claim 11, where each joining element of the plurality of joining elements is applied successively onto or into the region of the joint.

14. The method according to claim 9, wherein the region of the joint is beveled.

* * * * *